United States Patent
Kitatsuji et al.

(10) Patent No.: US 11,517,989 B2
(45) Date of Patent: Dec. 6, 2022

(54) CAM DEVICE, WORK SUPPLY DEVICE AND SEPARATING DEVICE

(71) Applicant: KOYO MACHINE INDUSTRIES CO., LTD., Osaka (JP)

(72) Inventors: Hideto Kitatsuji, Yao (JP); Tsutomu Tokumoto, Yao (JP)

(73) Assignee: KOYO MACHINE INDUSTRIES CO., LTD., Osaka (JP)

( * ) Notice: Subject to any disclaimer, the term of this patent is extended or adjusted under 35 U.S.C. 154(b) by 53 days.

(21) Appl. No.: 17/101,859

(22) Filed: Nov. 23, 2020

(65) Prior Publication Data

US 2021/0197333 A1 Jul. 1, 2021

(30) Foreign Application Priority Data

Dec. 26, 2019 (JP) .............................. JP2019-235767

(51) Int. Cl.
| | |
|---|---|
| *F16H 53/00* | (2006.01) |
| *B23Q 7/04* | (2006.01) |
| *F16H 53/06* | (2006.01) |
| *F16H 25/18* | (2006.01) |

(52) U.S. Cl.
CPC .............. *B23Q 7/04* (2013.01); *F16H 53/06* (2013.01); *F16H 25/18* (2013.01)

(58) Field of Classification Search
CPC ............ B23Q 7/04; F16H 53/06; F16H 25/18
See application file for complete search history.

(56) References Cited

U.S. PATENT DOCUMENTS

| | | | |
|---|---|---|---|
| 2015/0101438 A1* | 4/2015 | Mansfield | ............... F16H 53/06 74/473.25 |
| 2020/0063838 A1* | 2/2020 | O'Neill | ................... F16H 21/28 |

FOREIGN PATENT DOCUMENTS

| | | | | |
|---|---|---|---|---|
| EP | 1538117 A1 | * | 6/2005 | ............ B23Q 5/341 |
| JP | 2002130421 A | * | 5/2002 | |
| JP | 2002130421 A | | 5/2002 | |

* cited by examiner

*Primary Examiner* — Zakaria Elahmadi
(74) *Attorney, Agent, or Firm* — Studebaker & Brackett PC

(57) ABSTRACT

A cam device includes a drive cam, a follower, a holding cam, and a restriction roller. The drive cam reciprocally rotates. The follower intermittently reciprocate linearly by the drive cam. The holding cam is rotationally driven integrally with the drive cam. The restriction roller is provided on the follower and restricts a movement of the follower by coming in contact with the holding cam. The holding cam separates from the restriction roller and the holding cam is in a holding release state, when the drive cam is in an engaged state with the follower.

7 Claims, 15 Drawing Sheets

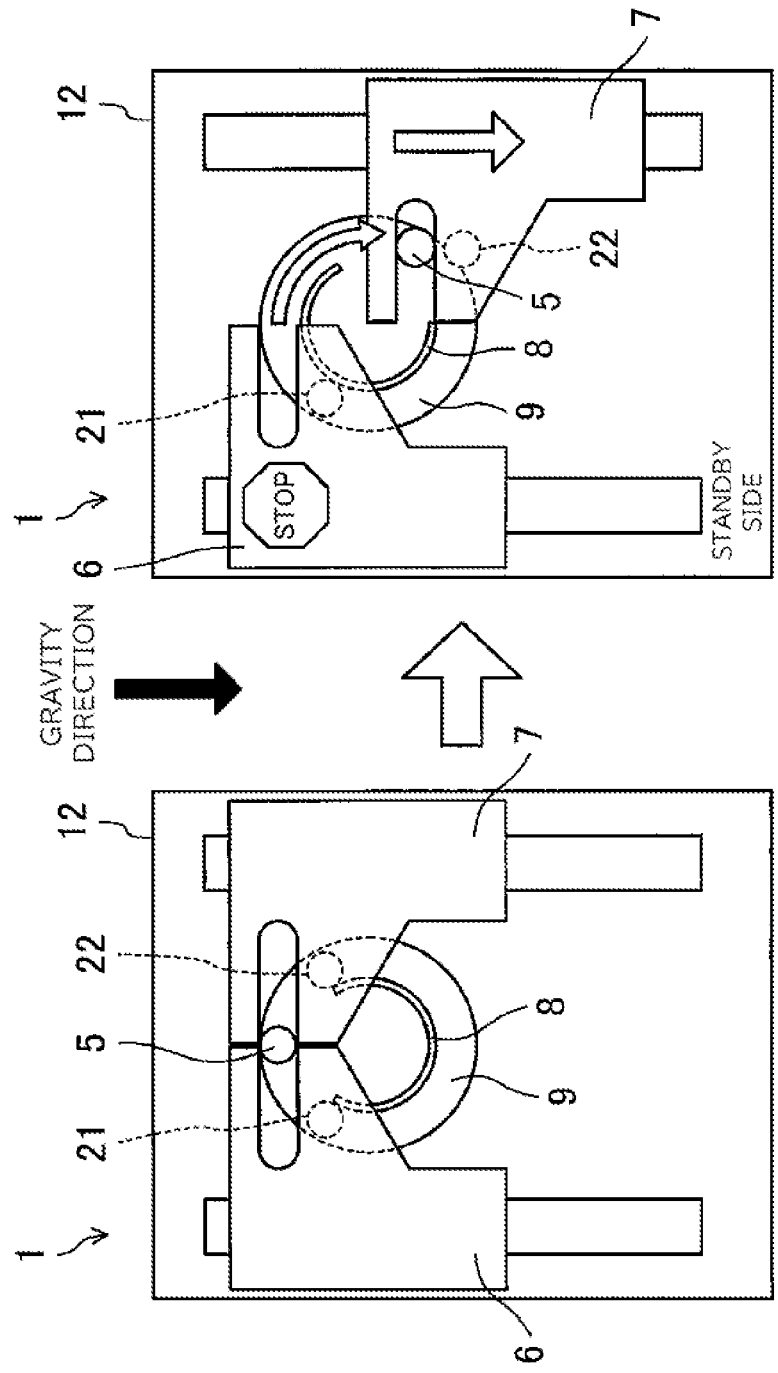

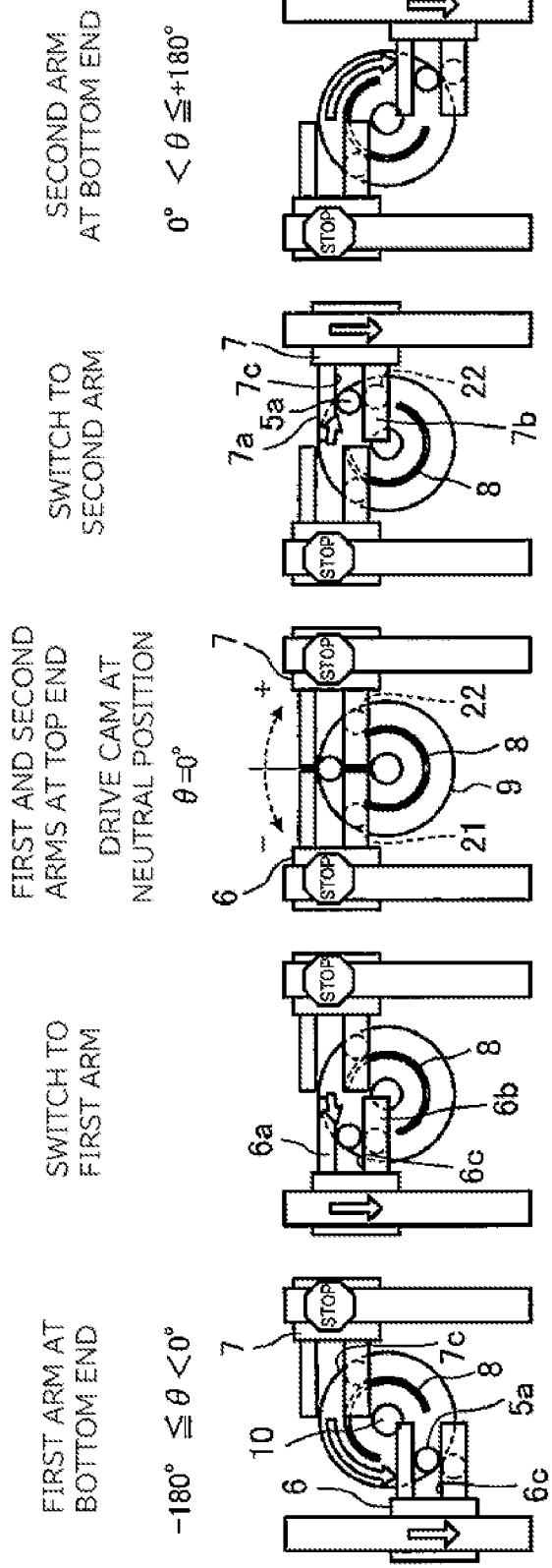

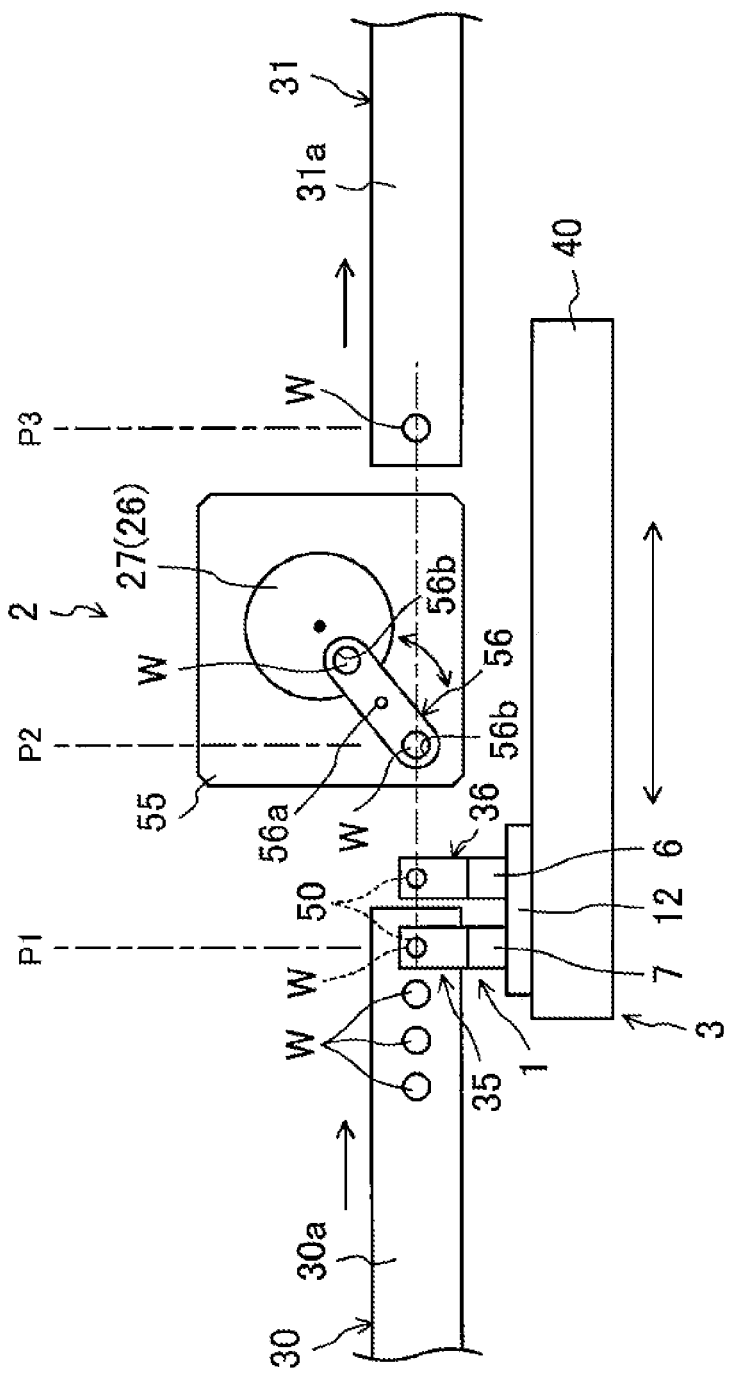

CAM DEVICE, WORK SUPPLY DEVICE AND SEPARATING DEVICE

CROSS-REFERENCE TO RELATED APPLICATIONS

This application is based on and claims priority from Japanese Patent Application No. 2019-235767 filed on Dec. 26, 2019, the contents of which are incorporated herein by reference.

TECHNICAL FIELD

The present disclosure relates to a cam device for converting a rotational movement of a drive unit into a linear movement on a driven side, a work supply device including the cam device, and a separating device including the cam device.

BACKGROUND ART

JP2002-130421A discloses a type of a cam device of related art. The cam device of the related art includes a drive cam, a first driven cam and a second driven cam. The drive cam reciprocally rotates in forward and reverse directions within a predetermined angle range. The first and second driven cams intermittently reciprocate linearly by the reciprocal rotation of the drive cam.

As illustrated in FIG. 12, in the cam device 601 of the related art, the driven cams 606a and 607a are arranged to be linearly movable parallel to each other at opposite positions on both sides of a rotation center of the drive cam 605. The driven cams 606a and 607a can be cam-engaged with the drive cam 605, respectively.

In the cam device 601, the elastic force of a spring 621 is used to hold an arm (arm 606 in a timing of FIG. 12) on a standby side at a top end. Arms 606 and 607 include vertical holes 621a and the springs 621 are inserted therein. An upper end of the hole 621a is closed by an upper spring receiver 628 and the arms 606 and 607 are supported by receiving the upward elastic forces of the springs 621. Lower ends of the springs 621 are supported by lower spring receivers 623 which can move up and down in the holes 621a of the arms 606 and 607 and the lower spring receiver 623 is supported by an adjusting bolt 622 from below. The adjusting bolt 622 extends downward through an opening on a lower surface of the arm and is supported by a bracket 625 provided at a lower end of a base 612. The adjusting bolt 622 is a screw adjusting type and the elastic force of the spring 621 is adjusted by moving the lower spring receiver 623 up and down. Upper stoppers 624 are attached to the base 612 above the arms 606 and 607. As illustrated in FIG. 13, the standby side arm 606 lifted upward by the spring 621 is held at the top end position. In such a structure, the spring 621 is compressed each time the arms 606 and 607 descend.

In the cam device of the related art, the spring may have a short life of two to three years, because the spring may be broken due to repeated compression load. In addition, according to the cam device of the related art, it would be necessary to adjust an elastic force of the spring. In addition, there would be restrictions on weights of attachments such as chucks and weights of works to be transferred, because a support rigidity of the arm on the standby side is low. Moreover, since the spring is compressed when the arm descends, energy loss would be large. Furthermore, the device may have to be assembled against an elastic force of the spring.

SUMMARY

The present disclosure relates to a cam mechanism capable of converting a rotational movement into a linear movement with a simple structure.

According to the present disclosure, a cam device includes a drive cam, a follower, a holding cam, and a restriction roller. The drive cam reciprocally rotates. The follower intermittently reciprocate linearly by the drive cam. The holding cam is rotationally driven integrally with the drive cam. The restriction roller is provided on the follower and restricts a movement of the follower by coming in contact with the holding cam. The holding cam separates from the restriction roller and the holding cam is in a holding release state, when the drive cam is in an engaged state with the follower.

BRIEF DESCRIPTION OF DRAWINGS

FIG. 2A is a front view of the cam device in a standby position.

FIG. 2B is a front view of the cam device in a state where a second arm descends.

FIG. 3A is a front view of the cam device in a state where a first arm is at a bottom end.

FIG. 3B is a front view of the cam device in a state where a drive cam is switched to the first arm.

FIG. 3C is a front view of the cam device in a state where the first and second arms are at their top ends and a drive cam is at a neutral position.

FIG. 3D is a front view of the cam device in a state where the drive cam is switched to the second arm.

FIG. 3E is a front view of the cam device in a state where the second arm is at a bottom end.

FIG. 5E is a plan view of the cam device illustrating an outline of the work supply/discharge cycle.

DESCRIPTION OF EMBODIMENTS

Figure 1A:
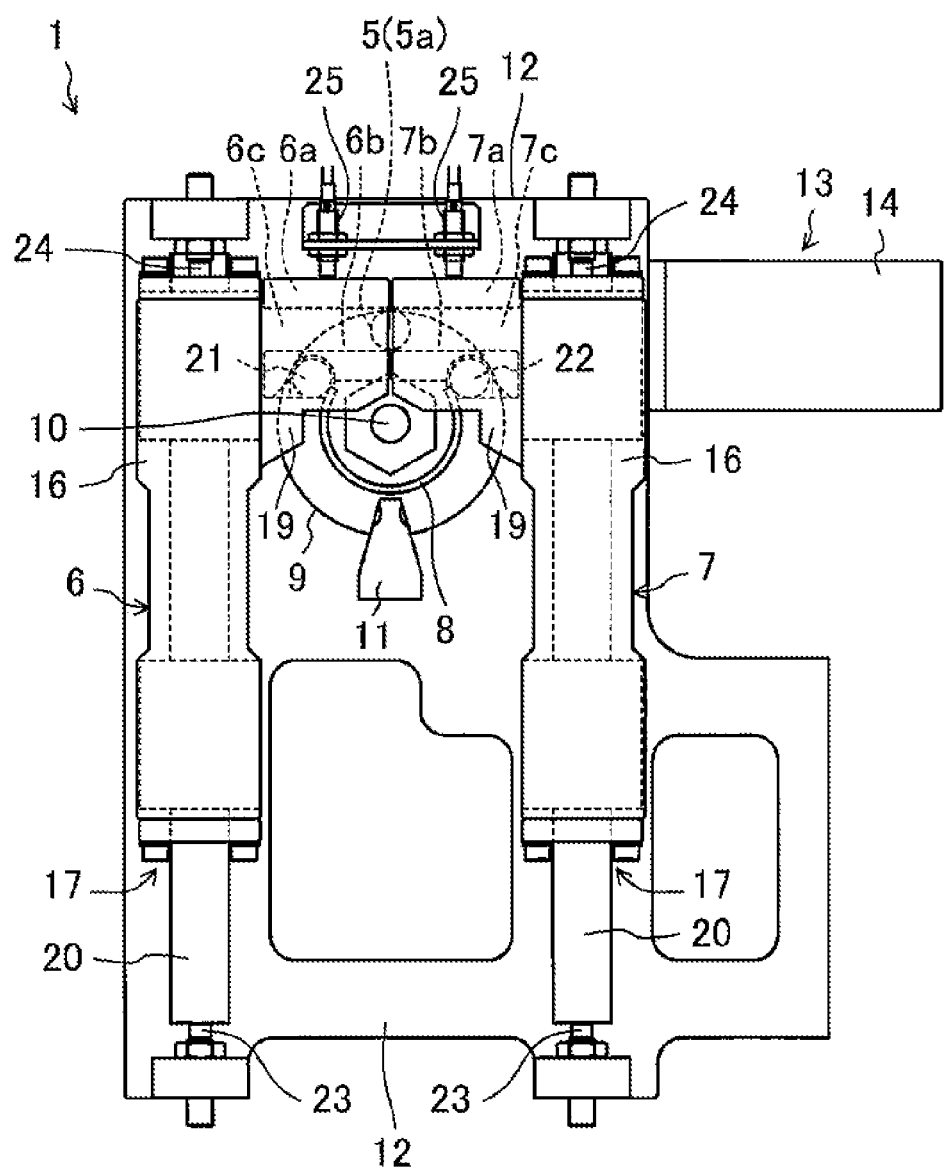
FIG. 1A is a front view of a cam device according to an embodiment.

Embodiments will be described below with reference to the drawings.

First Embodiment

Configuration of Cam Device

FIGS. 1A to 3E illustrate a cam device 1 according to a first embodiment. The cam device 1 converts a rotational motion of a drive unit into a linear motion on a driven side. Specifically, the cam device 1 forms, for example, a main part of a work supply device 3 of a vertical double disk surface grinder 2 shown in FIGS. 5A to 5E.

The cam device 1 mainly includes a drive cam 5 and a pair of first and second arms 6 and 7. The drive cam 5 reciprocally rotates in forward and reverse directions within a predetermined angle range. The pair of first and second arms 6 and 7, as a first follower and a second follower, intermittently reciprocate linearly by the reciprocating rotation of the drive cam 5.

Figure 4C:
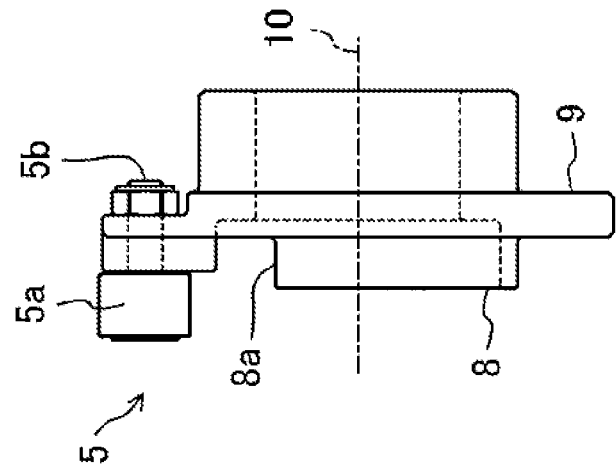
FIG. 4C is a side view of the cam disc.
Figure 4A:
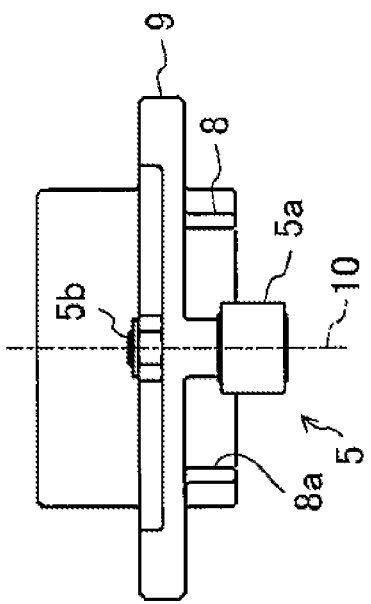
FIG. 4A is a plan view of a cam disc including the drive cam and a holding cam.
Figure 4B:
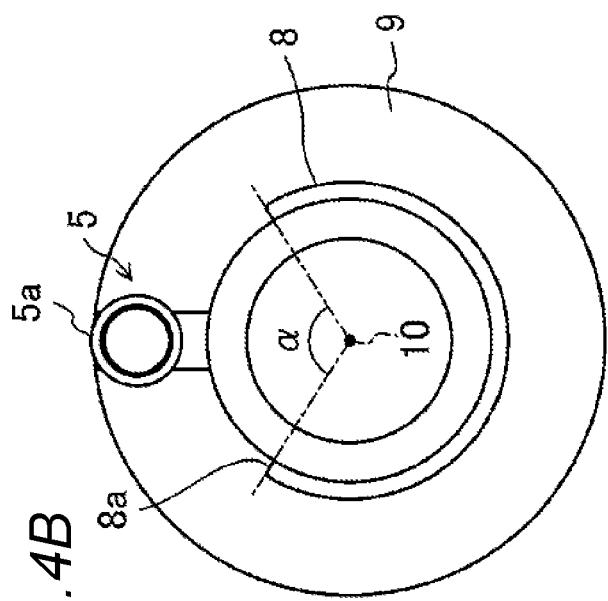
FIG. 4B is a front view of the cam disc.

As illustrated in FIGS. 4A to 4C, the cam device 1 includes a cam disk 9 and a cylindrical cam roller 5a. The cam disk 9 is a rotating disk which is supported so as to be rotatable in the forward and reverse directions about a rotation center, that is, a rotation axis 10. The cylindrical cam roller 5a forming the drive cam 5 is rotatably supported on an outer peripheral edge portion which is apart from the rotation axis 10 by a predetermined distance. In the illustrated embodiment, a horizontally extending rotation axis 10 of the cam disk 9 is rotatably supported at the center of the upper part of a frame-shaped device body 12. The rotation axis 10 is drivingly connected to a drive device 13 as a drive unit which is a rotary drive source.

The drive device 13 includes a servo motor 14 as a main part. The servo motor 14 is provided in the device body 12. An output shaft of the servo motor 14 is connected to the rotation axis 10 of the cam disk 9 via a worm reducer 15. Therefore, when the servo motor 14 is driven to rotate in the forward and reverse directions, the rotation is transmitted to the rotation axis 10 through the worm reducer 15, and then the cam disk 9 reciprocatedly rotates in the forward and reverse directions by an amount corresponding to the rotation amount of the servo motor 14. The worm reducer 15 may be omitted.

As illustrated in FIGS. 4A to 4C, the cam roller 5a is rotatably supported by the cam disk 9 about a roller shaft 5b made of a bolt or the like. The cam roller 5a forms a main part of the drive cam 5. A neutral position is defined to a situation when the cam roller 5a positions vertically above the center of rotation of the cam disk 9. Depending on purposes, the cam roller may have a structure in which a cylindrical cam shaft member is integrally fixed to the drive cam 5, in addition to the freely rotatable cam roller 5a as illustrated in FIGS. 4A to 4C. By configuring the drive cam 5 with the rotatable cam roller 5a, it is possible to reduce problems such as abrasion, seizure, and kinking due to friction.

The cam disk 9 includes a holding cam 8 which is rotationally driven integrally about the rotation axis 10 together with the reciprocating rotation of the drive cam 5. The holding cam 8 can hold the first and second arms 6 and 7 at a top end. The holding cam 8 includes an arcuate rib having an arcuate outer peripheral surface discontinuous on a side facing the drive cam 5. The arcuate outer peripheral surface has a center on the rotation axis 10 of the cam disk 9. For example, as illustrated in FIG. 4B, an opening 8a is formed on a side of the drive cam 5 over a predetermined rotation range (angle α), and the arcuate rib projects in a C-shape when viewed from the front. The holding cam 8 may have at least an arcuate outer peripheral surface and is not necessarily to be the arcuate rib.

Figure 1B:
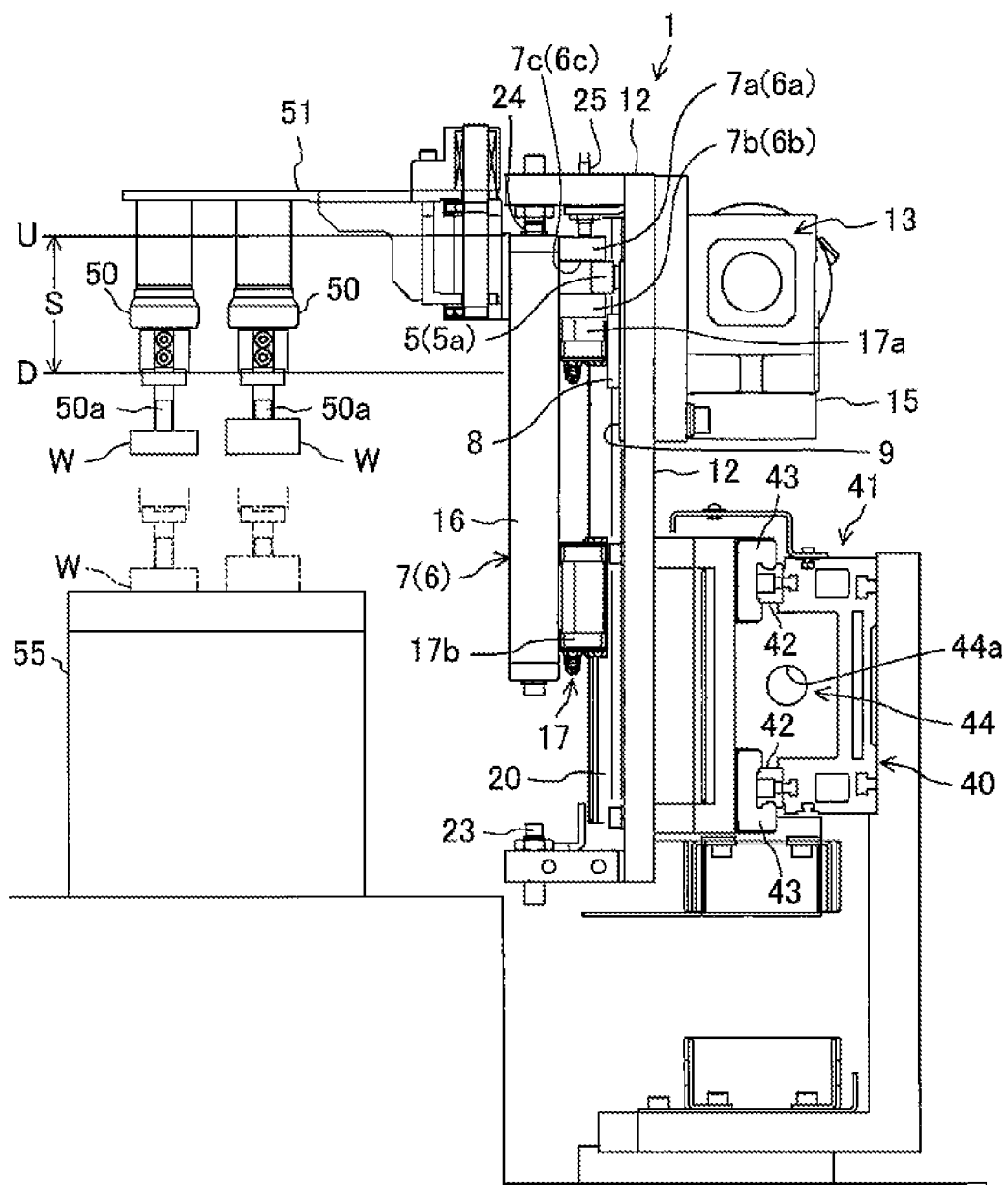
FIG. 1B is a side view of the cam device according to the embodiment.

As illustrated in FIGS. 1A and 1B, the first and second arms 6 and 7 having the same symmetrical structure are provided in parallel with each other. The first and second arms 6 and 7 are respectively attached to a pair of guide rails 20 provided in parallel on the device body 12 and configured to be linearly guided in a vertical direction. The first and second arms 6 and 7 do not necessarily have to be parallel to each other and may be inclined with respect to each other. As illustrated in FIG. 1B, a chuck 50 for holding a work W is provided on each of the first and second arms 6 and 7 via a chuck mounting bracket 51 extending in a horizontal direction. In the embodiment, two chucks 50 are provided on one arm, but only one chuck may be provided, or three or more chucks may be provided. The chucks 50 provided on the first and second arms 6 and 7 have, for example, opening/closing chuck claws 50a which are appropriately opened or closed by an air cylinder. These chuck claws 50a direct vertically downward. The chuck 50 may be a vacuum suction type. The chuck claws 50a do not have to direct vertically downward, but may direct horizontally. In FIG. 1A, the chuck 50 and the chuck mounting bracket 51 are not illustrated for simplification.

The first arm 6 includes a slide body 16 which is provided in the device body 12 vertically slidably by a slide mechanism 17. The upper part of the slide body 16 forms a follower which is disengageably engaged with the cam roller 5a of the drive cam 5. Specifically, the slide body 16 includes guide members 17a and 17b (see FIG. 1B) fixedly mounted on the upper and lower portions of a back surface of the slide body 16. The guide members 17a and 17b are slidable along the guide rail 20 provided in the device body 12 to extend linearly in the vertical direction. That is, the guide members 17a and 17b and the guide rail 20 form the slide mechanism 17. The slide mechanism 17 allows the slide body 16 to smoothly slide in the vertical direction in a stable state.

The first arm 6 includes upper and lower pieces 6a and 6b provided on a support bracket 19. The upper and lower pieces 6a and 6b are vertically separated at a predetermined interval. The support bracket 19 is mounted and fixed on the upper end of the slide body 16 in a side of the cam disk 9. The upper and lower pieces 6a and 6b are arranged while considering the shape and dimensions of the cam roller 5a, the rotation path, and the like, so that the cam roller 5a of the drive cam 5 is slidably and disengageably engaged with an engagement groove 6c formed therebetween. Similarly, the second arm 7 includes upper and lower pieces 7a and 7b provided on a support bracket 19. The upper and lower pieces 7a and 7b are vertically separated at a predetermined interval. The support bracket 19 is mounted and fixed on the upper end of the slide body 16 in a side of the cam disk 9. The upper and lower pieces 7a and 7b are arranged while considering the shape and dimensions of the cam roller 5a, the rotation path, and the like, so that the cam roller 5a of the drive cam 5 is slidably and disengageably engaged with an engagement groove 7c formed therebetween.

The first arm 6 includes a first restriction roller 21. The first restriction roller 21 restricts the movement of the first arm 6 by coming into contact with the arcuate outer peripheral surface of the holding cam 8. The second arm 7 includes a second restriction roller 22. The second restriction roller 22 restricts the movement of the second arm 7 by coming into contact with the arcuate outer peripheral surface of the holding cam 8. In other words, the holding cam 8 is configured to support the first restriction roller 21 or the second restriction roller 22 from below within a predetermined rotation range of the cam disk 9 to support the first arm 6 or the second arm 7 at the top end.

By configuring the first restriction roller 21 and the second restriction roller 22 as rotatable rollers, problems such as abrasion, seizure, and kinking due to friction can be reduced. The cut-out range (angle c) of the opening 8a of the above holding cam 8 is set such that the first restriction roller 21 or the second restriction roller 22 of the arm on the rotation direction side of the cam disk 9 is released from the holding cam 8 when the cam disk 9 starts rotating.

As a result, the first and second arms 6 and 7 can be cam-engaged with the drive cam 5 alternately continuous and independently of each other. That is, when the drive cam 5 is in an engagement state with the first arm 6, the drive cam 5 is in an engagement release state with the second arm 7 and the holding cam 8 comes into contact with the second restriction roller 22 to hold the second arm 7 in a predetermined position, while the holding cam 8 is separated from the first restriction roller 21 and is in a holding release state. In addition, when the drive cam 5 is in an engagement state with the second arm 7, the drive cam 5 is in an engagement release state with the first arm 6 and the holding cam 8 comes into contact with the first restriction roller 21 to hold the first arm 6 at a predetermined position, while the holding cam 8 is separated from the second restriction roller 22 and is in a holding release state. By providing the holding cam 8, it is not necessary for the first and second arms 6 and 7 to be biased in the linear movement direction by the biasing member, and the own weights of the first and second arms 6 and 7 are configured to be held by the holding cam 8. A lifting stroke S of the first and second arms 6 and 7 is determined by the radius of rotation of the drive cam 5 and the rotation angle of the cam disk 9. The lifting speed is determined by the rotation speed of the cam disk 9. The speed can be set freely depending on situations including whether the arm is descending or ascending, and whether the work is held or not. Which of the first and second arms 6 and 7 is driven can be switched depending on whether the drive cam 5 rotates left or right from the neutral position. The arm on a side opposite to the arm which is moving up or down is held at the top end, that is, the standby position because the first restriction roller 21 or the second restriction roller 22 continues to be supported at a fixed position by the holding cam 8.

In FIG. 1A, a cam stopper 11 capable of abutting on the cam roller 5a is provided at a position corresponding to the lower part of the cam disk 9 of the device body 12. A screw-type lower stopper 23 which abuts and engages with the lower end of the slide body 16 is provided on the lower portion of the device body 12. Similarly, a screw-type upper stopper 24 which abuts and engages with the upper end of the slide body 16 is provided on the upper portion of the device body 12. However, the stoppers 11, 23, and 24 are not for abutting on the first and second arms 6 and 7 or the cam disk 9 to determine the stroke S, but are provided for preparing for a case where the drive cam 5 breaks or the servo motor 14 fails. Proximity sensors 25 for the first and second arms 6 and 7 are provided at the upper ends of the device body 12. By detecting the first and second arms 6 and 7 with those proximity sensors 25, it is configured to determine that the first and second arms 6 and 7 have been elevated to a linear movement initial position U (shown in FIG. 1B and the like).

Configuration of Work Supply Device

Figure 5A:
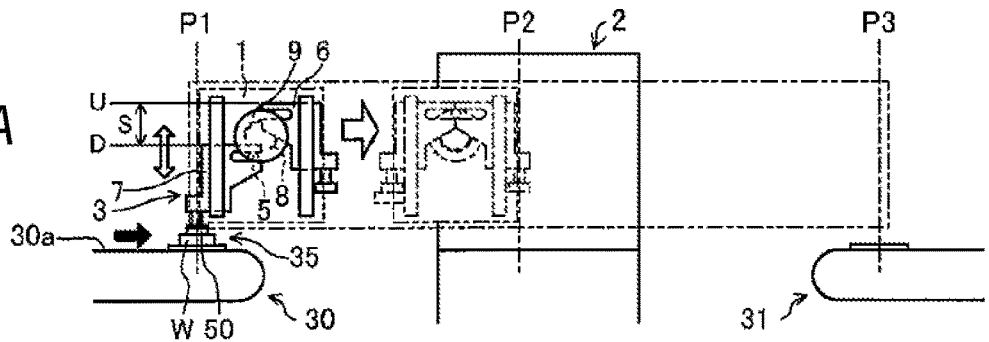
FIG. 5A is a rear view of the cam device in an unprocessed work passing process of a work supply/discharge cycle.

Next, the configuration of the work supply device 3 including the cam device 1 will be specifically described. As illustrated in FIGS. 5A to 5E, the work supply device 3 includes the cam device 1 as a drive device for a loading unit 35 which supplies the work W to the surface grinder 2 and an unloading unit 36 which discharges the work W. FIG. 5A is a rear view and the rear side of the cam device 1 is not illustrated in detail for easy viewing.

As illustrated in FIG. 5E, the surface grinder 2 is a vertical double disk type equipped with a pair of upper and lower grinding wheels 26 and 27 for simultaneously grinding the upper and lower surfaces of the work W (the drawing illustrates only the grinding wheel 27 on the lower side). Both of those grinding wheels 26 and 27 are arranged to be rotatably driven in the upper and lower positions with the height of the work W interposed therebetween. A carrier 56 is provided to be horizontally movable. The carrier 56 loads and unloads the work W between a work supply/discharge position P2 on a bed 55 and the grinding wheels 26 and 27.

The carrier 56 is structured to be rotated or swung about a central axis 56a. Work pockets 56b into which the work W can be inserted and held in the vertical direction are formed at both ends of the carrier 56. By the rotation or swing of the carrier 56, the works W in the work pockets 56b at both ends of the carrier 56 is configured to be horizontally reciprocally rotated by 180° between the work supply/discharge position P2 and a processing position between the grinding wheels 26 and 27.

A carry-in conveyor 30 and a carry-out conveyor 31 are used for carrying the work W into and out of the surface grinder 2 through the work supply device 3 and are composed of belt conveyor devices, for example. Belt transfer surfaces 30a and 31a of the two conveyors 30 and 31 are positioned at substantially the same height as the work supply/discharge position P2 on the bed 55. The front end portion of the carry-in conveyor 30 and the rear end portion of the carry-out conveyor 31 are respectively set to a work carry-in position P1 and a work carry-out position P3. The transfer devices 30 and 31 at the entrance and exit are not particularly limited to conveyors, shuttles, robots, or the likes, as long as they can carry the works W in and out at the delivery position. Even when the transfer direction of the work W is opposite to (from right to left) that in FIG. 5A, an operation can be done by simply reversing the movement of the device left and right.

As illustrated in FIG. 1B, the work supply device 3 is provided on a device base 40 provided on a side of the surface grinder 2 so that the cam device 1 described above can be horizontally moved via a horizontal movement device 41.

The horizontal movement device 41 includes a pair of upper and lower moving rails 42 extending horizontally in the device base 40 on the fixed side. Moving guides 43 attached and fixed to the work supply device 3 on the movable side are provided to be able to move on the moving rails 42. The horizontal movement device 41 also includes a drive source 44 for moving the work supply device 3 in the horizontal direction is provided. Although not specifically illustrated, the drive source 44 includes a ball screw mechanism 44a and a servo motor (not illustrated). The ball screw mechanism 44a is provided to extend in parallel with the moving rail 42 between the work supply device 3 and the moving rail 42. The servo motor rotationally drives the ball screw mechanism 44a.

By the horizontal movement device 41, as illustrated in FIG. 5E, the loading unit 35 and the unloading unit 36 of the work supply device 3 are configured to horizontally move and stop positioning between the work carry-in position P1, the work supply/discharge position P2 of the surface grinder 2, and the work carry-out position P3. In the work carry-in position P1, the work W is carried in by the carry-in conveyor 30. In the work carry-out position P3, the work W is carried out by the carry-out conveyor 31. The work carry-in position P1, the work supply/discharge position P2, and the work carry-out position P3 are arranged horizontally.

In the illustrated embodiment, the second arm 7 of the cam device 1 forms the actuator of the loading unit 35 of the work supply device 3, while the first arm 6 forms the actuator of the unloading unit 36.

Then, the work supply device 3 is horizontally moved by the horizontal movement device 41 and either one of the loading unit 35 and the unloading unit 36 of the work supply device 3 is positioned at the work carry-in position P1, the work supply/discharge position P2, and the work carry-out position P3. At each of those positions P1, P2, and P3, a lifting movement (reciprocating linear movement) is made between (movement stroke S) an standby position U which is the top dead center (that is, the linear movement initial position) and an operation position D which is the bottom dead center, in such a manner that it is configured to be drive-controlled to perform a chucking operation.

Operation of Cam Device

Next, the operation of the cam device 1 described above will be described.

In the embodiment, as illustrated in FIGS. 1A and 1B, the state in which the cam roller 5a is at the uppermost position is set as the neutral reference position. As illustrated in FIG. 3C, when the cam disk 9 is in the neutral position, the holding cam 8 engages with the first and second restriction rollers 21 and 22 and both the first and second arms 6 and 7 are held at the top end, that is, the standby position.

First, the case of raising and lowering the first arm 6 will be described. When the cam disk 9 starts rotating to the left from the neutral position, as illustrated in FIG. 3B, the cam roller 5a of the cam disk 9 engages with the engagement groove 6c between the upper and lower pieces 6a and 6b of the first arm 6. Almost at the same time, the contact between the holding cam 8 of the cam disk 9 and the first restriction roller 21 of the first arm 6 are released.

Next, as illustrated in FIG. 3A, the first arm 6 descends to a predetermined position as the cam disk 9 rotates.

Next, when the cam disk 9 starts rotating in the opposite direction (to the right), the first arm 6 starts rising.

After that, as illustrated in FIG. 3C, when the cam disk 9 rotates to the neutral position, the restriction roller 21 of the first arm 6 comes into contact with the outer peripheral surface of the holding cam 8 and the first arm 6 is held at the top end. As a result, the lifting operation of the first arm 6 for one stroke S is performed.

Next, the case of raising and lowering the second arm 7 will be described. First, when the cam disk 9 starts rotating to the right from the neutral position, as illustrated in FIG. 3D, the cam roller 5a of the cam disk 9 engages with the engagement groove 7c between the upper and lower pieces 7a and 7b of the second arm 7. Almost at the same time, the contact between the outer peripheral surface of the holding cam 8 of the cam disk 9 and the second restriction roller 22 of the second arm 7 is released.

Next, as illustrated in FIG. 3E, the second arm 7 descends to a predetermined position as the cam disk 9 rotates.

Next, when the cam disk 9 starts rotating in the opposite direction (to the left), the second arm 7 starts rising.

After that, as illustrated in FIG. 3C, when the cam disk 9 rotates to the neutral position, the second restriction roller 22 of the second arm 7 comes into contact with the outer peripheral surface of the holding cam 8 and the second arm 7 is held at the top end. As a result, the lifting operation of the second arm 7 for one stroke S is performed.

The lifting stroke S of the first and second arms 6 and 7 can be appropriately set by adjusting the rotation angle of the drive cam 5 within the range of the above semicircular orbit.

Figure 12:
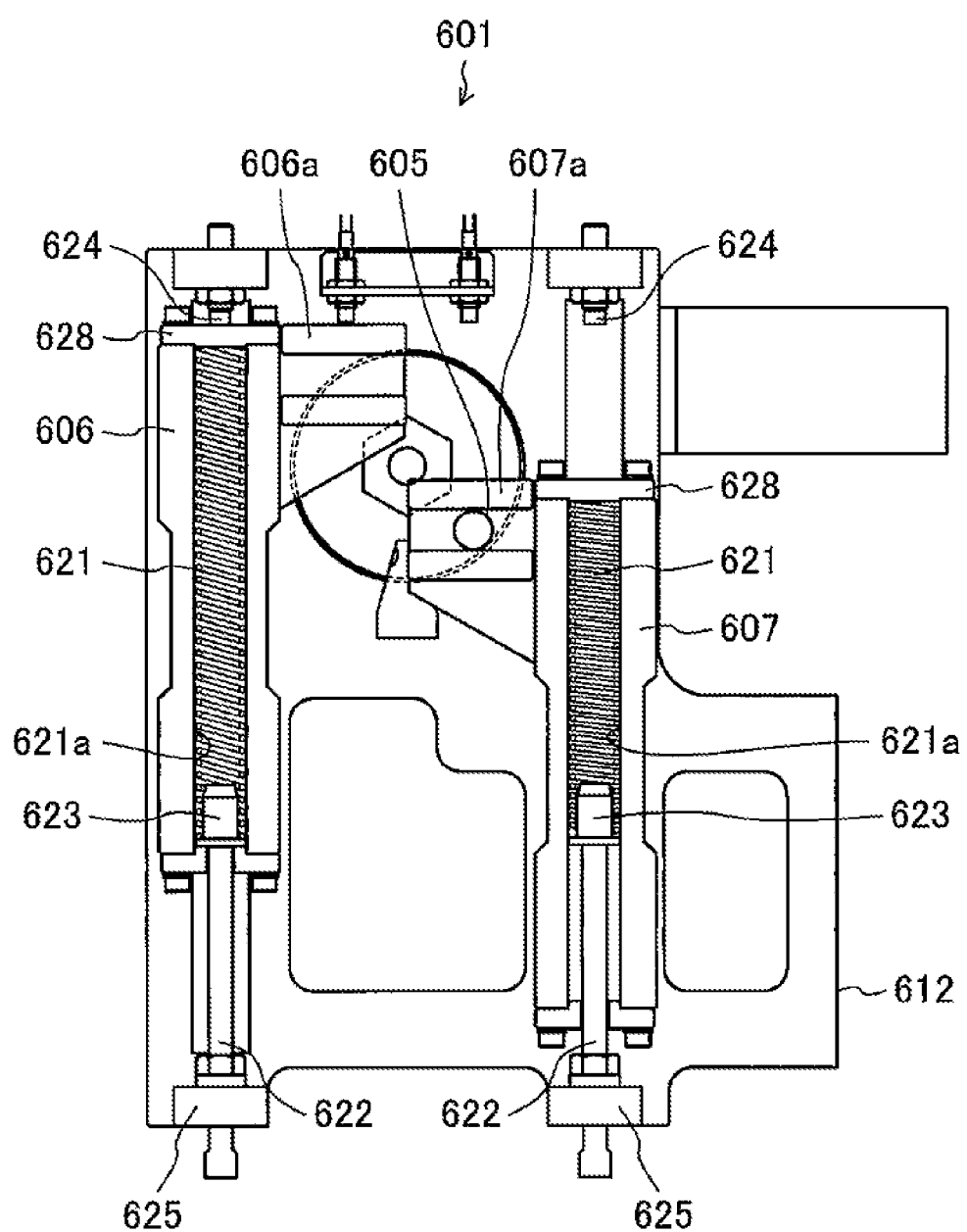
FIG. 12 is a front view illustrating a cam device of the related art.
Figure 13:
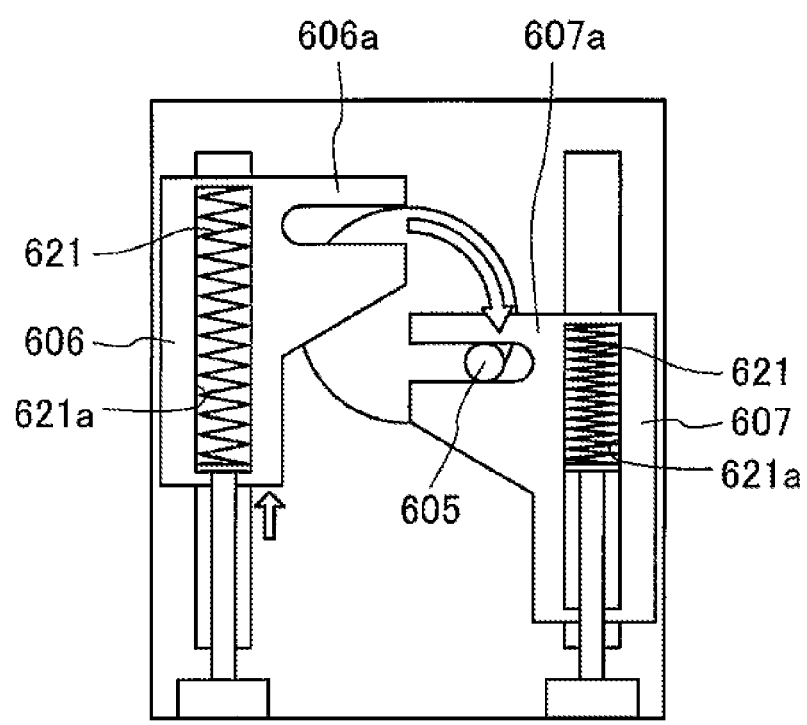
FIG. 13 is an enlarged front view illustrating an outline of an operation of the cam device of the related art.

In the cam device 1, the drive cam 5 is alternately reciprocally rotation-controlled to the first arm 6 side and the second arm 7 side in FIG. 1A by the servo motor 14 so that the steps described above are repeated and the first and second arms 6 and 7 intermittently perform reciprocating linear motions (vertical lifting movements in the present embodiment). Thus, in the present embodiment, it is not necessary to provide a spring 621 as illustrated in FIGS. 12 and 13 and the holding cam 8 does not cause the first arm 6 and the second arm 7 to drop, so that the first arm 6 and the second arm 7 continue to be supported in a fixed position.

Supplying and Discharging Work W by Work Supply Device

In the surface grinder 2 configured as described above, supply and discharge operations of the work W by the work supply device 3 are performed as follows.

(Step S01) In a delivery process of the unprocessed work, as illustrated in FIG. 5A, in the work supply device 3, the loading unit 35 is positioned at the work carry-in position P1 of the carry-in conveyor 30 and the second arm 7 grabs the unprocessed work W that has been carried to the work carry-in position P1. That is, the second arm 7 of the loading unit 35 descends from the standby position U to the operation position D by the cam operation of the cam device 1 described above and the chuck claw 50a of the chuck 50 grabs and holds the work W at the work carry-in position P1. Then, the second arm 7 ascends and returns from the operation position D to the standby position U by the cam operation of the cam device 1 described above.

Figure 5B:
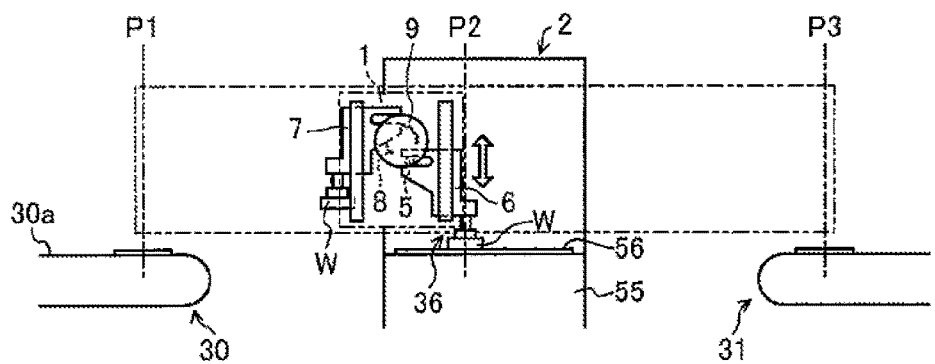
FIG. 5B is a rear view of the cam device in a processed work removal process.

(Step S02) In a removal process of the processed work, the work supply device 3 horizontally moves toward the work carry-out position P3 and the unloading unit 36 is positioned at the work supply/discharge position P2 of the surface grinder 2. Then, as illustrated in FIG. 5B, the first arm 6 grasps the processed work W discharged to the work supply/discharge position P2. That is, the first arm 6 of the unloading unit 36 descends from the standby position U to the operation position D by the cam operation of the cam device 1 described above and the chuck claw 50a of the chuck 50 grabs and holds the processed work W in the work pocket 56b of the carrier 56 which is stopped and waiting at the work supply/discharge position P2. Then, the first arm 6 ascends and returns from the operation position D to the standby position U by the cam operation of the cam device 1 described above.

Figure 5C:
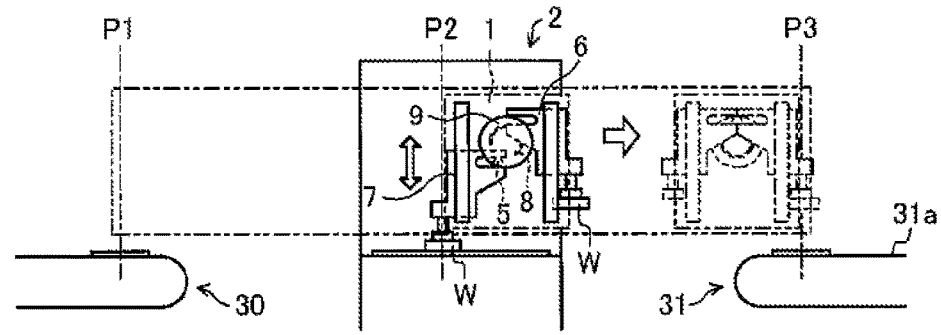
FIG. 5C is a rear view of the cam device in an unprocessed work loading process.

(Step S03) In a loading process of the unprocessed work, as illustrated in FIG. 5C, the work supply device 3 moves horizontally toward the work carry-out position P3 again and the loading unit 35 is positioned at the work supply/discharge position P2. Then, the second arm 7 places and supplies the unprocessed work W to the work supply/discharge position P2. That is, similar to Step S01, the second arm 7 of the loading unit 35 descends from the standby position U to the operation position D and the chuck claw 50a of the chuck 50 releases the held work W and places the work W in the empty work pocket 56b of the carrier 56, which stands by on the work supply/discharge position P2. Then, the second arm 7 ascends and returns from operation position D to the standby position U again.

Figure 5D:
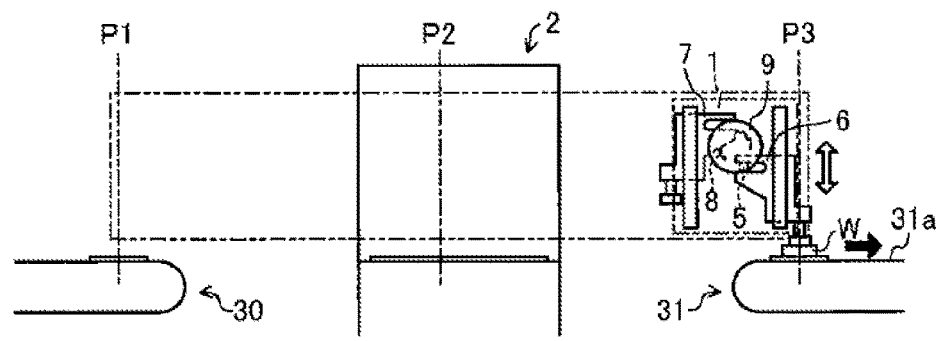
FIG. 5D is a rear view of the cam device in a processed work passing process.

(Step S04) In the delivery process of the processed work, as illustrated in FIG. 5D, the work supply device 3 moves horizontally toward the work carry-out position P3 again and the unloading unit 36 is positioned at the work carry-out position P3 of the carry-out conveyor (unloading device) 31, and then by the cam operation of the cam device 1, the first arm 6 descends from the standby position U to the operation position D and the chuck claw 50a of the chuck 50 places the processed work W, which has been held, on the work carry-out position P3. Next, the first arm 6 ascends and returns to the standby position U.

(Step S05) The work supply device 3 horizontally moves to the left (returning direction) in FIG. 5A to return to the work carry-in position P1, and thereafter, the steps S01 to S04 are sequentially repeated. On the other hand, in step S03, the unprocessed work W supplied to the work supply/discharge position P2 is moved to the processing position between the grinding wheels 26 and 27 by the rotation or swing of the carrier 56, as illustrated in FIG. 5E, and surface grinding is performed on the upper and lower surfaces by the grinding wheels 26 and 27 which are rotationally driven. The work W that has completed grinding is discharged to the work supply/discharge position P2 by the rotation or swing of the carrier 56 again and is carried out to the carry-out conveyor 31 in Step S02.

As described above, in the cam device 1 according to the embodiment, by adopting the structure in which the pair of first and second arms 6 and 7 linearly operates by the single drive cam 5, the operating regions of the first and second arms 6 and 7 are almost the same as the lifting stroke S of the drive cam 5. Therefore, the device structure of the cam device 1 can be downsized and simplified. As a result, the operating areas of the loading unit 35 and the unloading unit 36 of the work supply device 3 may be small and the work supply device 3 can be downsized and simplified to reduce the installation space. The drive source of the first and second arms 6 and 7 of the loading unit 35 and the unloading unit 36 is a single shared source, and in such viewpoint as well, the work supply device 3 can be downsized and the device cost can be reduced. In addition, the drive control of the first and second arms 6 and 7 is also mechanically synchronized and the control system can be simplified.

As described above, in the embodiment, by rotating the drive cam 5, the rotational movement is surely converted into the linear movements of the first and second arms 6 and 7. The arm opposite to the arm in linear motion continues to be held in the fixed position by the holding cam 8. Then, when the drive cam 5 is brought into the engaged state, the corresponding restriction roller is separated from the holding cam 8 and is brought into the holding release state, so that the linear movement of the arm is possible according to the operation of the drive cam 5. Therefore, it is not necessary to bias the arm with the spring 621 to hold the arm in a fixed position as in the case of the related art illustrated in FIGS. 12 and 13. As a result, the number of parts is reduced to facilitate the assembly and the energy loss generated when compressing the spring 621 is reduced, and further the maintenance work due to the deterioration of the spring 621 is reduced. The trouble of fine adjustment of the biasing force of the spring 621 can also be saved.

Therefore, according to the cam device 1 of the embodiment, it is possible to realize a cam mechanism capable of converting the rotational movement into the linear movement with a simple structure. The cam device 1 includes fewer components than the one including the spring 621 as in the related art in FIGS. 12 and 13, is easy to assemble and adjust, and is space-saving, lightweight, and low-cost. The cam device 1 only needs to control the rotation direction and speed of the cam disk 9 and the electric control system is simple, low cost and energy saving. Since the cam device 1 is a positive cam drive, the cam device 1 has high reliability, high rigidity and high accuracy, and a long life.

Although not illustrated, the arm on the standby side can be pulled out upward while the other arm is moving up and down. By rotating the cam disk 9 by 180° or more, the drive cam 5 comes out of the engagement grooves 6c and 7c of the arm, so that the arm can also be pulled out downward. Such action can also be used to exchange arms.

First Modification Example

Figure 6:
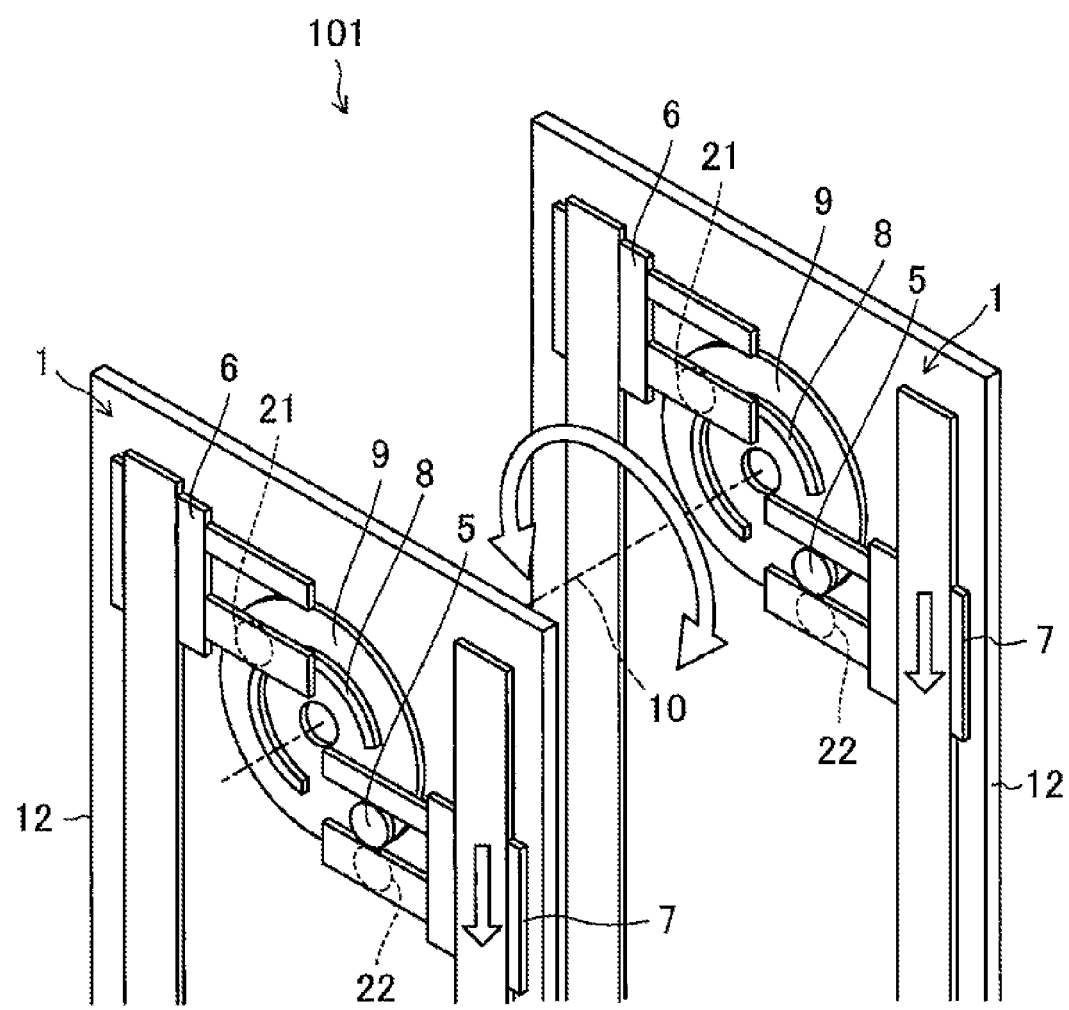
FIG. 6 is a perspective view illustrating an outline of a cam device according to a first modification example of a first embodiment.

FIG. 6 illustrates a cam device 101 according to a first modification example of the first embodiment. In the cam device 101, the cam devices 1 are parallelized. Specifically, it differs from the first embodiment in that a plurality of cam disks 9 are rotated by one rotation axis 10. In the following modification examples and embodiments, the same parts as those in FIGS. 1A to 5E are designated by the same reference numerals and letters and detailed description thereof will be omitted.

In the present modification example, a plurality of drive cams 5 reciprocally rotate about the common rotation axis 10 and a plurality of pairs of first and second arms 6 and 7 reciprocate linearly. The operation of each cam device 1 is the same as that of the first embodiment.

Since a plurality of drive cams 5 can rotate at the same time in the present modification example, the plurality of arms can be used for carrying a plurality of works W at the same time or carrying a long size work by gripping it with a plurality of chucks 50.

Second Modification Example

Figure 7:
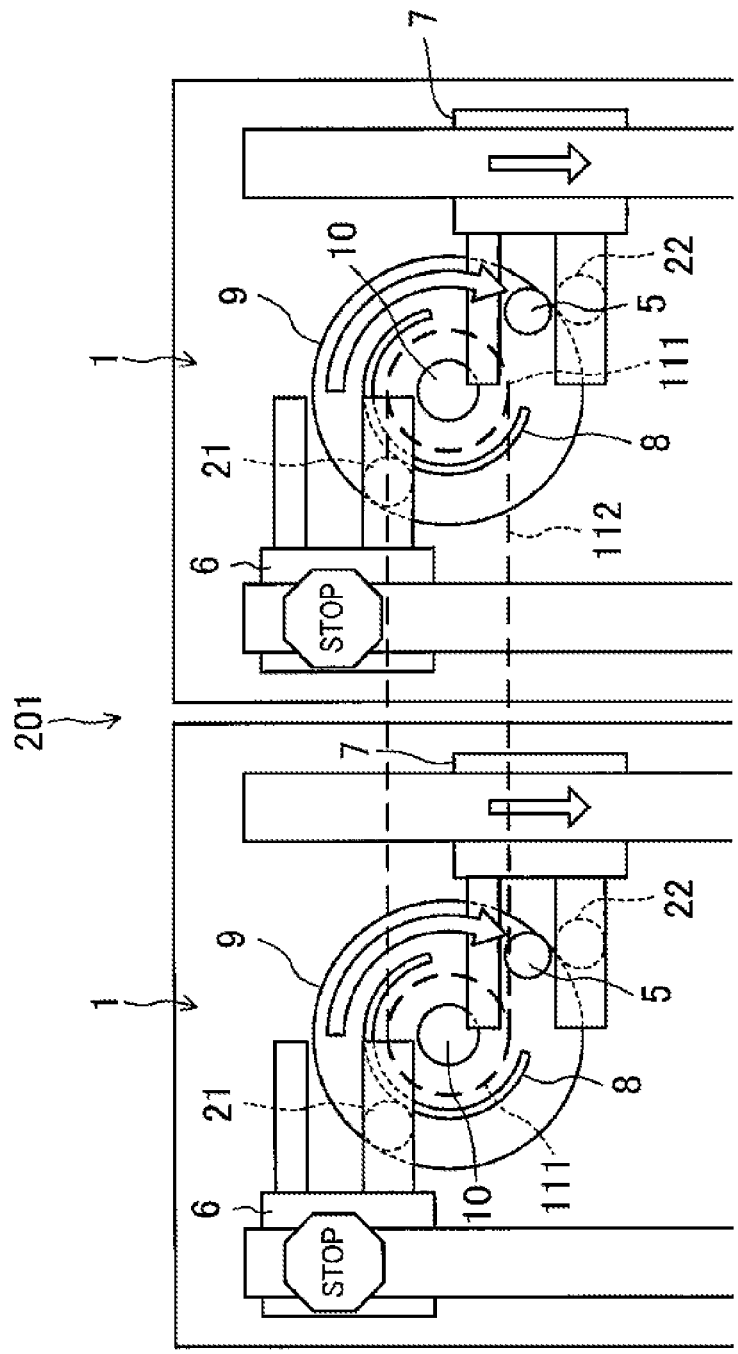
FIG. 7 is a front view illustrating an outline of a cam device according to a second modification example of the first embodiment.

FIG. 7 illustrates a cam device 201 according to a second modification example of the first embodiment. In the cam device 201, the cam devices 1 include multiple axes.

Specifically, the present embodiment is configured such that drive cams 5 are simultaneously driven via a belt 112 hung on pulleys 111 which are rotated about the rotation axes 10 and a plurality of pairs of first and second arms 6 and 7 reciprocate linearly.

In the present modification example, it is possible to simultaneously control a plurality of first arms 6 and 6 or second arms 7 and 7. Thus, for example, the plurality of first arms or second arms can be used for simultaneous transfer of the works W to a plurality of machine tools.

Third Modification Example

Figure 8:
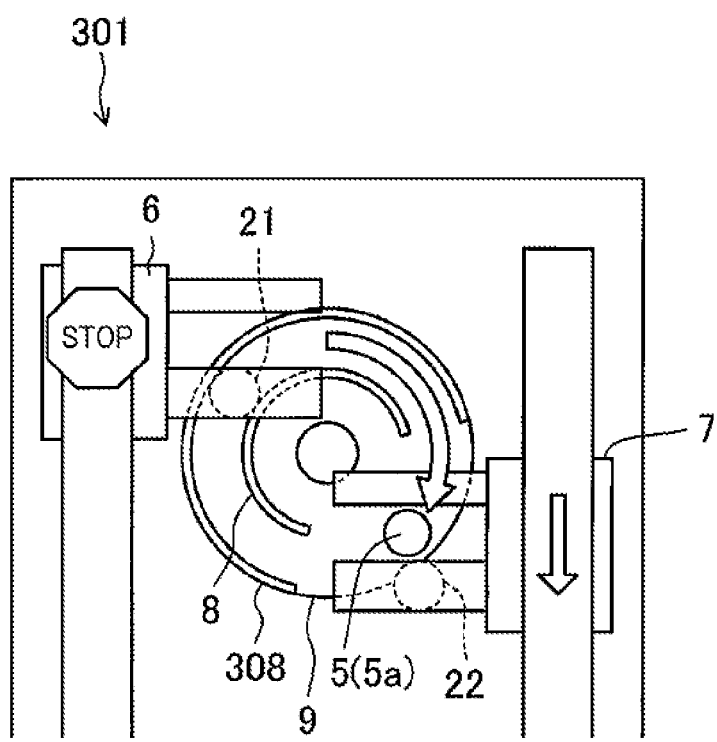
FIG. 8 is a front view illustrating an outline of a cam device according to a third modification example of the first embodiment.

FIG. 8 illustrates a cam device 301 according to a third modification example of the first embodiment. In the third modification example, an outer holding cam 308 having a concentric arcuate inner peripheral surface is further formed on the outer side in the radial direction of the holding cam 8. The outside holding cam 308 and the holding cam 8 are configured such that the first arm 6 or the second arm 7 on the standby side is restricted in vertical movement by the first restriction roller 21 or the second restriction roller 22.

In the present modification example, since the first restriction roller 21 and the second restriction roller 22 are pinched by the inner peripheral surface of the outer holding cam 308 and the outer peripheral surface of the holding cam 8, the movement of the arm on the standby side is restricted. Thus, it is not necessary to restrict the movement of the arm on the standby side by using its own weight. That is, there is no restriction of placing the cam device 301 with respect to a direction of gravity. Therefore, the movement direction of the first and second arms 6 and 7 can be horizontal direction or the like. It is also possible to deal with a case where a reaction force is received from below when the arm is on standby. The outer holding cam 308 is not limited to an arcuate rib as long as the outer holding cam 308 has an arcuate inner peripheral surface.

Second Embodiment

Figure 9:
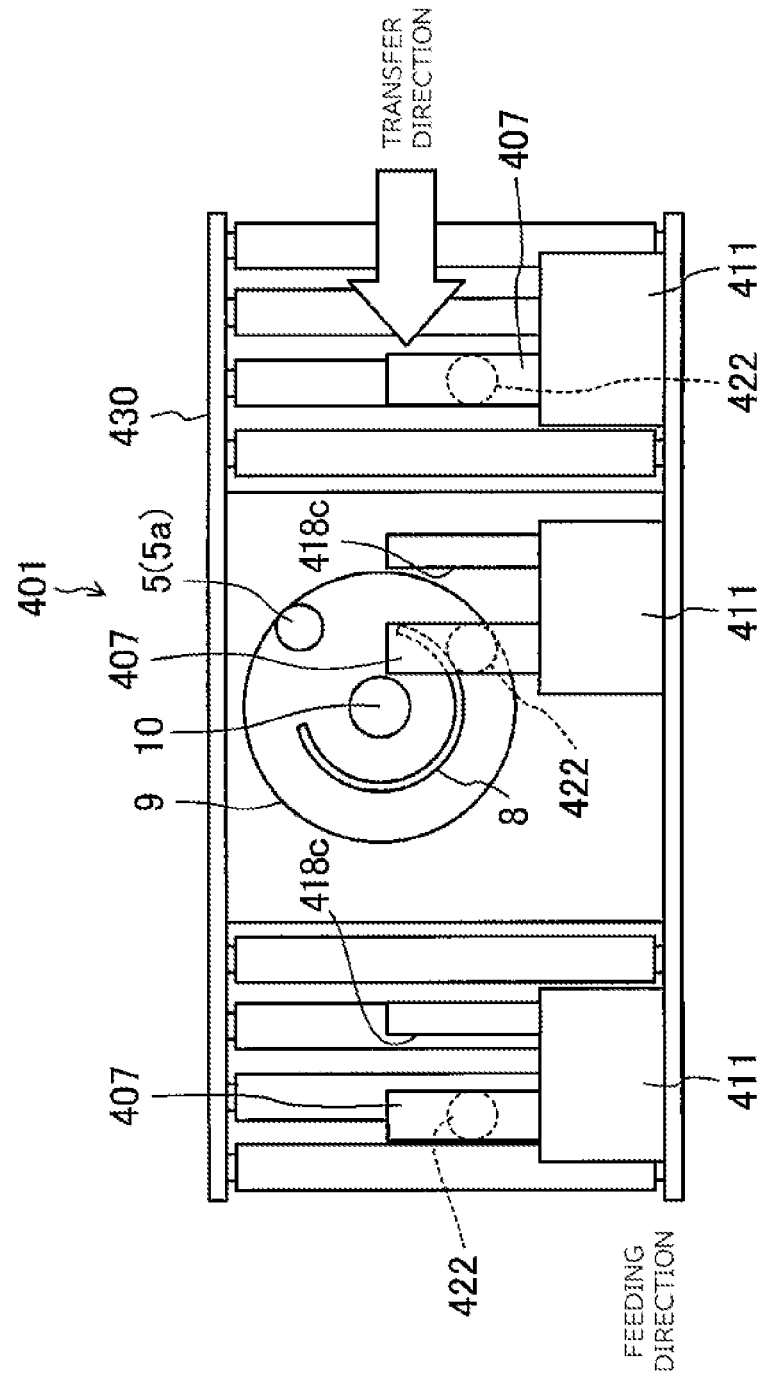
FIG. 9 is a plan view illustrating an outline of a cam device according to a second embodiment.
Figure 10:
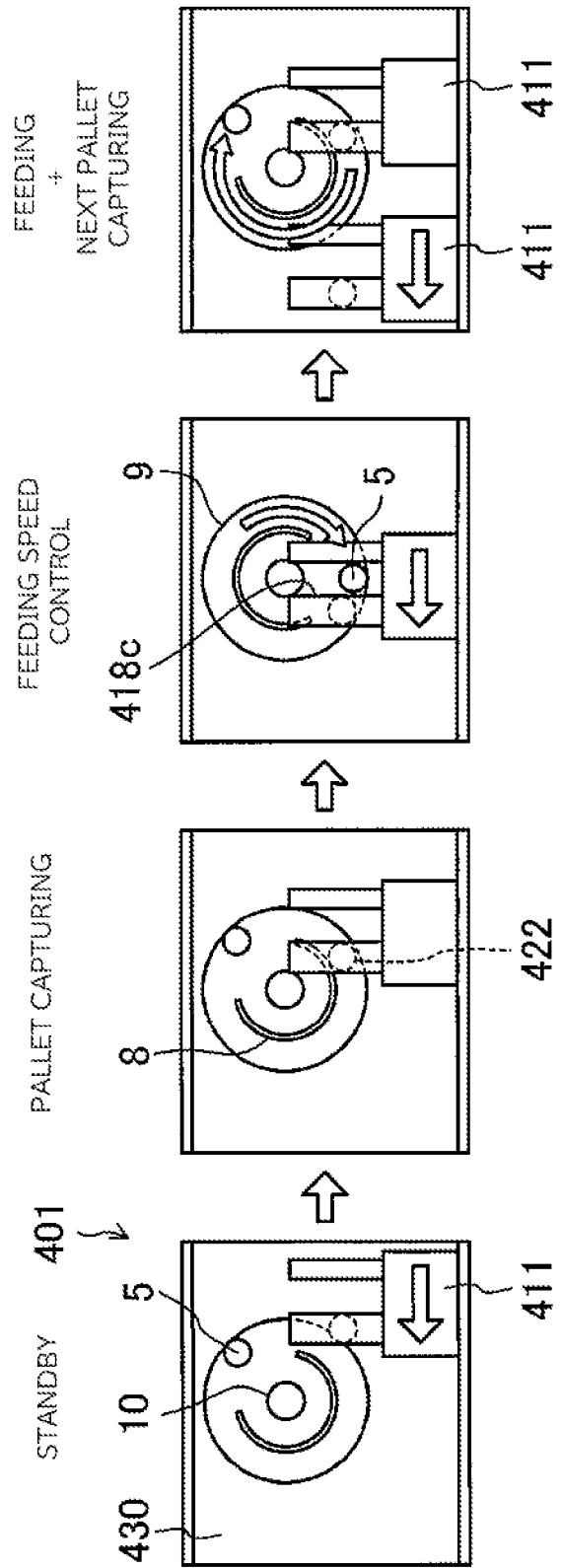
FIG. 10A is a plan view of the cam device according to the second embodiment in a standby state.
FIG. 10B is a plan view of the cam device according to the second embodiment in a pallet capturing state.
FIG. 10C is a plan view of the cam device according to the second embodiment in a feeding speed control state.
FIG. 10D is a plan view of the cam device according to the second embodiment in a feeding and next pallet capturing state.

FIGS. 9 and 10 illustrate a cam device 401 according to a second embodiment, which is different from the first embodiment described above in that only one follower 407 is provided.

The embodiment is the same in that the cam device 401 for converting the rotational movement of the drive device 13 into the linear movement on the driven side is provided. However, in the embodiment, only the follower 407 as one follower is provided instead of the pair of followers. The cam device 401 includes the holding cam 8 and the restriction roller 422 as in the first embodiment described above.

In the embodiment, the follower 407 is arranged to be linearly movable in the transfer direction at a position apart from the rotation center of the drive cam 5 by a predetermined distance. The follower 407 is configured to be cam-engaged/disengaged from the drive cam 5, so that the holding cam 8 is separated from the restriction roller 422 to be in the holding release state when the drive cam 5 is in the engaged state with the follower 407.

The follower 407 forms a part of a pallet 411. The pallet 411 includes an engagement groove 418c. The engagement groove 418c engages with the drive cam 5 as in the first embodiment described above. As a result, the cam device 401 of this embodiment is configured so that the pallet 411 is transferred in a feeding direction by the drive cam 5.

Next, the operation of the cam device 401 of the present embodiment will be described.

First, as illustrated in FIG. 9, a plurality of pallets 411 are placed on a roller conveyor 430.

When the pallet 411 moves on the roller conveyor 430 as illustrated in FIG. 10A, the restriction roller 422 of the flowing pallet 411 comes into contact with the arcuate outer peripheral surface of the holding cam 8 as illustrated in FIG. 10B. Therefore, the pallet 411 is once captured on the spot and stopped on the roller conveyor 430.

After that, as illustrated in FIG. 10C, when the drive cam 5 fits into the engagement groove 418c, the engagement between the restriction roller 422 and the holding cam 8 is released. By controlling the rotation speed of the cam disk 9, the pallet 411 is sent out while the transfer speed is adjusted.

As illustrated in FIG. 10D, the next pallet 411 can be captured during the feeding operation of the previous pallet 411.

As described above, while the restriction roller 422 is in contact with the outer peripheral surface of the holding cam 8, the pallet 411 is stopped at a predetermined position, and when the drive cam 5 is engaged, the engagement between the restriction roller 422 and the holding cam 8 is released and the pallet 411 is transferred in the feeding direction. This has the advantage that one cam device 401 can cover the stopper and the separating mechanism.

When the follower 407 is provided on only one side as in the present embodiment, the drive cam 5 can be rotated 360°. Thus, in combination with the roller conveyor 430, the drive cam 5 can be used as a separating mechanism with speed control of a pallet transfer mechanism. While the drive cam 5 is engaged with the engagement groove 418c of the pallet 411, the pallet 411 can be reliably transferred in the transfer direction at a desired speed or the like as the drive cam 5 rotates.

Modification Example

Figure 11:
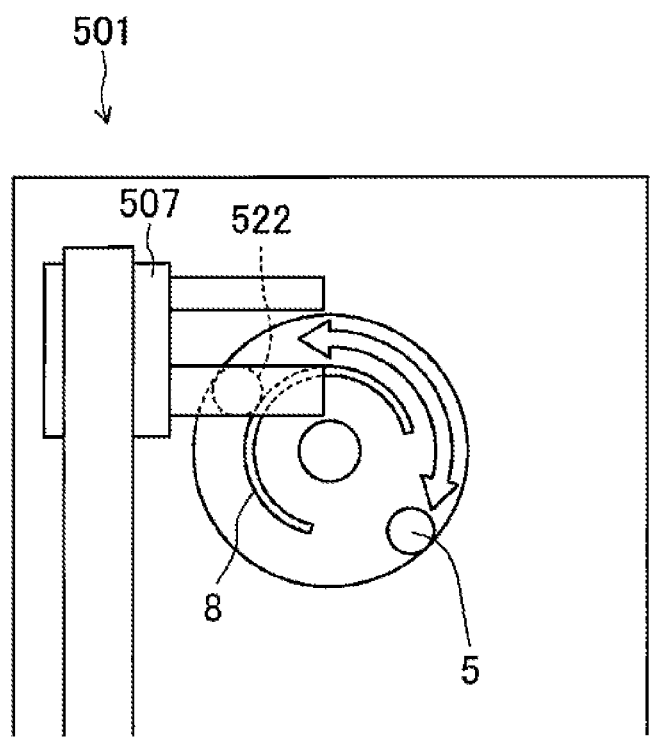
FIG. 11 is a front view illustrating an outline of a cam device according to a modification example of the second embodiment.

FIG. 11 illustrates a cam device 501 according to a modification example of the second embodiment, which is different from the second embodiment in that the cam device 501 is used as a driving force for an external device.

In the present modification example, a follower 507 is provided only on one side. Thus, when a restriction roller 522 of the follower 507 is in contact with the outer peripheral surface of the holding cam 8 and the follower 507 is waiting, the rotation of the drive cam 5 can be used as a driving force for an external device (not illustrated). The external device mentioned here is not particularly limited.

Other Embodiments

The cam device may have the following configurations.

That is, although the cam device 1 is adopted to the work supply device 3 of the vertical double disk surface grinder 2 in the first embodiment, the cam device of the invention can be adopted not only to a work supply device for other machine tools including a horizontal surface grinder, but also for other processing machines and assembling devices which perform similar operations, or the constituent parts of these various devices.

The embodiments described above are only preferable examples and are not intended to limit the scope of the invention, its applications, and uses.

In accordance with an exemplary embodiment, the holding cam for restricting the movement of the first and second followers is provided.

In accordance with an exemplary embodiment, a cam device converts a rotational movement of a drive unit to a linear movement on a driven side. The cam device includes a drive cam, a pair of first follower and second follower, a holding cam, a first restriction roller, and a second restriction roller. The drive cam is driven by the drive unit and reciprocally rotates in forward and reverse directions within a predetermined angle range around a rotation axis. The pair of first follower and second follower intermittently reciprocate linearly by the drive cam. The holding cam is driven rotationally integrally with a rotational reciprocating movement of the drive cam about the rotation axis and has an arcuate outer peripheral surface which is discontinuous on a side facing the drive cam. The first restriction roller is provided on the first follower and restricts a movement of the first follower by coming in contact with the holding cam. The second restriction roller is provided on the second follower and restricts a movement of the second follower by coming in contact with the holding cam. The first follower and the second follower are capable of being cam-engaged with the driven cam alternatively and independently of each other. The first follower and the second follower are arranged to be capable of moving linearly at opposite positions on both sides of a rotation center of the drive cam. When the drive cam is in an engaged state with the first follower, the drive cam is in an engagement release state with the second follower and the holding cam comes into contact with the second restriction roller to hold the second follower at a predetermined position and the holding cam is separated from the first restriction roller and is in a holding release state with the first follower. When the drive cam is in an engaged state with the second follower, the drive cam is in an engagement release state with the first follower and the holding cam comes into contact with the first restriction roller to hold the first follower at a predetermined position and the holding cam is separated from the second restriction roller and is in a holding release state with the second follower.

According to the configuration described above, by rotating the drive cam, the rotational movement is surely converted into the linear movement of the first follower and the second follower. The follower on the opposite side of the follower in the linear motion continues to be supported at a fixed position by the holding cam. Then, when the drive cam is in the engaged state, the corresponding restriction roller is separated from the holding cam and is in the holding release state, so that linear movement is possible according to the operation of the drive cam. Therefore, it is no longer necessary to bias the follower with the spring to hold in a fixed position as in the related art. As a result, the number of parts is reduced, assembly is facilitated, the energy loss generated when compressing the spring is reduced, and the maintenance work due to the deterioration of the spring is reduced. It is possible to save the trouble of finely adjusting the biasing force of the spring.

In accordance with an exemplary embodiment, the first follower and the second follower may be configured not to be biased in a linear movement direction by the biasing member.

According to the configuration described above, the spring as in the related art in FIGS. 12 and 13 does not have to be provided and the first follower and the second follower do not drop and continue to be supported at a fixed position due to the holding cam which supports the vertically downward force due to gravity.

In accordance with an exemplary embodiment, an outer holding cam having a concentric arcuate inner peripheral surface may be further formed on an outer side in a radial direction of the holding cam. The outer holding cam and the holding cam may be configured so that the first follower or the second follower on the standby side is restricted in a vertical movement by the first restriction roller or the second restriction roller.

According to the configuration described above, the movement of the follower on the standby side is also restricted from the outer side in the radial direction by the inner peripheral surface of the outer holding cam. Therefore, it is not necessary to constrain the movement of the follower on the standby side due to gravity. Accordingly, a setting direction of the cam device is not constrained in the gravity direction, it would be possible to set the movement direction of the follower to the horizontal direction or the like.

In accordance with an exemplary embodiment, the first follower and the second follower may include arms having work chucks. The first follower and the second follower may be configured to handle works gripped by the work chucks.

According to the configuration described above, the work can be efficiently handled by using the rotational movement of the drive cam.

In accordance with an exemplary embodiment, a plurality of drive cams may be reciprocally rotated about the common rotation axis and a plurality of pairs of first follower and second follower may be linearly reciprocated.

According to the configuration described above, since a plurality of drive cams can be rotated at the same time, the drive cams can be used when simultaneously transferring a plurality of works or when gripping and transferring a long work with a plurality of chucks.

In accordance with an exemplary embodiment, a cam device converts a rotational movement of a drive unit to a linear movement on a driven side. The cam device includes a drive cam, a follower, a holding cam and a restriction roller. The drive cam is driven by the drive unit and reciprocally rotates in forward and reverse directions within a predetermined angle range around a rotation axis. The follower intermittently reciprocates linearly by the drive cam. The holding cam is rotationally driven integrally with a rotational reciprocating movement of the drive cam about the rotation axis. The holding cam has an arcuate outer peripheral surface which is discontinuous on a side facing the drive cam. The restriction roller is provided on the follower and restricts a movement of the follower by coming in contact with the holding cam. The follower is arranged to be linearly movable at a position apart from a rotation center of the drive cam by a predetermined distance. The follower is configured to be cam-engaged with the drive cam, so that the holding cam separates from the restriction roller and is in a holding release state, when the drive cam is in an engaged state with the follower.

According to the configuration described above, by rotating the drive cam, the rotational movement is surely converted into the linear movement of the follower. Then, when the drive cam is engaged, the restriction roller is released from the holding cam and is in the holding release state, so that linear movement is possible according to the operation of the drive cam. Therefore, it is possible to use the rotation of the drive cam as the driving force of the external device during standby by setting the follower on only one side.

In accordance with exemplary embodiment, the follower may form a part of a pallet The pallet may be configured to be transferred in a feeding direction by the drive cam.

According to the configuration described above, when the follower is provided on only one side, the drive cam can be rotated 360°. Thus, in combination with a roller conveyor, the drive cam can be used as a separating mechanism with speed control of a pallet transfer device. In particular, while the restriction roller is in contact with the holding cam, the restriction roller is stopped at a predetermined position, and when the drive cam is engaged, the engagement between the restriction roller and the holding cam is released, and thus the pallet is transferred in a feeding direction.

In accordance with the embodiments and modification examples described in the above, since the holding cam rotates with the drive cam and holds the follower on the side not driven by the drive cam, it is not necessary to provide a spring. As a result, the cam mechanism can convert a rotational movement into a linear movement with a simple structure.

REFERENCE SIGNS 1, 101, 201, 301, 401, 501: cam device
2: surface grinder
3: work supply device
5: drive cam
6: first arm (first follower)
7: second arm (second follower)
8: holding cam
10: rotation axis
12: device body
13: drive device (drive unit)
21: first restriction roller
22: second restriction roller
308: outer holding cam
407: follower (one follower)
422: restriction roller
430: roller conveyor
507: follower (one follower)
522: restriction roller

What is claimed is:

1. A cam device configured to convert a rotational movement of a drive unit to a linear movement on a driven side, the cam device comprising:
a drive cam configured to be driven by the drive unit and to reciprocally rotate in forward and reverse directions within a predetermined angle range around a rotation axis;
a first follower configured to intermittently reciprocate linearly by the drive cam;
a second follower configured to intermittently reciprocate linearly by the drive cam;
a holding cam configured to be rotationally driven integrally with a rotational reciprocating movement of the drive cam about the rotation axis, the holding cam having an arcuate outer peripheral surface which is discontinuous on a side facing the drive cam;
a first restriction roller provided on the first follower and configured to restrict a movement of the first follower by coming in contact with the holding cam; and
a second restriction roller provided on the second follower and configured to restrict a movement of the second follower by coming in contact with the holding cam,
wherein the first follower and the second follower are arranged to be capable of moving linearly at opposite positions on both sides of the rotation axis of the drive cam, and
wherein the first follower and the second follower are capable of being cam-engaged with the drive cam alternatively and independently of each other, and configured such that
when the drive cam is in an engaged state with the first follower, the drive cam is in an engagement release state with the second follower and the holding cam comes into contact with the second restriction roller to hold the second follower at a predetermined position and the holding cam is separated from the first restriction roller and is in a holding release state with the first follower, and
when the drive cam is in an engaged state with the second follower, the drive cam is in an engagement release state with the first follower and the holding cam comes into contact with the first restriction roller to hold the first follower at a predetermined position and the holding cam is separated from the second restriction roller and is in a holding release state with the second follower.

2. The cam device according to claim 1, wherein the first follower and the second follower are configured not to be biased in a linear movement direction by the biasing member.

3. The cam device according to claim 1, further comprising:
an outer holding cam formed in a radially outer side of the holding cam, the outer holding cam having an arcuate inner peripheral surface which is concentric with the holding cam,
wherein the outer holding cam and the holding cam are configured to restrict the first follower or the second follower on a standby side from moving in a vertical direction by the first restriction roller or the second restriction roller.

4. A work supply device comprising:
the cam device according to claim 1,
wherein the first follower and the second follower respectively include arms having work chucks, and
wherein the first follower and the second follower are configured to handle works gripped by the work chucks.

5. The work supply device according to claim 4, wherein a plurality of drive cams are reciprocally rotated about a common rotation axis and a plurality of pairs of first follower and second follower are linearly reciprocated.

6. A cam device configured to convert a rotational movement of a drive unit to a linear movement on a driven side, the cam device comprising:
a drive cam configured to be driven by the drive unit and to reciprocally rotate in forward and reverse directions within a predetermined angle range around a rotation axis;
a follower configured to intermittently reciprocate linearly by the drive cam;
a holding cam configured to be rotationally driven integrally with a rotational reciprocating movement of the drive cam about the rotation axis, the holding cam having an arcuate outer peripheral surface which is discontinuous on a side facing the drive cam; and
a restriction roller provided on the follower and configured to restrict a movement of the follower by coming in contact with the holding cam,
wherein the follower is arranged to be linearly movable at a position apart from a rotation center of the drive cam by a predetermined distance, and
wherein the follower is configured to be cam-engaged with the drive cam, so that the holding cam separates from the restriction roller and the holding cam is in a holding release state when the drive cam is in an engaged state with the follower.

7. The cam device according to claim 6, wherein the follower forms a part of a pallet, and
wherein the pallet is configured to be transferred in a feeding direction by the drive cam.

* * * * *